United States Patent
Su et al.

(10) Patent No.: US 8,363,724 B2
(45) Date of Patent: Jan. 29, 2013

(54) METHODS AND APPARATUS USING VIRTUAL REFERENCE PICTURES

(75) Inventors: Yeping Su, Vancouver, WA (US); Peng Yin, West Windsor, NJ (US); Purvin Bibhas Pandit, Franklin Park, NJ (US); Cristina Gomila, Princeton, NJ (US)

(73) Assignee: Thomson Licensing, Boulogne, Billancourt (FR)

( * ) Notice: Subject to any disclaimer, the term of this patent is extended or adjusted under 35 U.S.C. 154(b) by 728 days.

(21) Appl. No.: 12/309,066

(22) PCT Filed: Jul. 10, 2007

(86) PCT No.: PCT/US2007/015719
§ 371 (c)(1),
(2), (4) Date: Jan. 5, 2009

(87) PCT Pub. No.: WO2008/008331
PCT Pub. Date: Jan. 17, 2008

(65) Prior Publication Data
US 2011/0243224 A1 Oct. 6, 2011

Related U.S. Application Data

(60) Provisional application No. 60/830,195, filed on Jul. 11, 2006.

(51) Int. Cl.
*H04N 7/12* (2006.01)
(52) U.S. Cl. .......... 375/240.15; 375/240.01; 375/240.12
(58) Field of Classification Search .................. None
See application file for complete search history.

(56) References Cited

U.S. PATENT DOCUMENTS

| | | | |
|---|---|---|---|
| 7,650,036 B2 | 1/2010 | Lei et al. | |
| 7,929,605 B2 | 4/2011 | Kimata et al. | |
| 8,179,960 B2 * | 5/2012 | McGowan et al. | 375/240.01 |
| 2002/0114392 A1 | 8/2002 | Sekiguchi et al. | |
| 2006/0146143 A1 | 7/2006 | Xin et al. | |

FOREIGN PATENT DOCUMENTS

| | | |
|---|---|---|
| JP | 2000-209588 A2 | 7/2000 |
| JP | 2004-088801 A | 3/2004 |
| JP | 2005-124200 A | 5/2005 |
| JP | 2006-129177 A2 | 5/2006 |
| JP | 2007-159111 A | 6/2007 |
| WO | 2005/011285 A1 | 2/2005 |
| WO | 2005/107253 A1 | 11/2005 |
| WO | 2006/064710 A1 | 6/2006 |

OTHER PUBLICATIONS

Budagavi: "Video Compression using Blur Compensation," Image Processing, IEEE International Conference in Genova, Italy, Sep. 11-14, 2005, Piscataway, NJ, pp. 882-885, XP-010851195.

Defaux et al.: "Background mosaicking for low bit rate video coding," IEEE Proceedings of the International Conference on Image Processing, Lausanne, Sep. 16-19, 1996, NY, pp. 673-676, XP010202155.

(Continued)

*Primary Examiner* — Donald Mills
(74) *Attorney, Agent, or Firm* — Robert D. Shedd; Guy H. Eriksen (57) ABSTRACT

There are provided methods and apparatus using virtual reference pictures. An apparatus includes an encoder for encoding at least one picture, using at least one virtual reference picture, to form a resultant bitstream. The at least one virtual reference picture is different than a previously decoded picture.

87 Claims, 5 Drawing Sheets

OTHER PUBLICATIONS

ISO/IEC JTC1/SC29/WG11 N7539: "Requirements on Multi-view Video Coding v.5," International Organization for Standardisation, Coding of Moving Pictures and Audio, Nice, France, Oct. 2005, 5 pgs.

ISO/IEC JTC1/SC29/WG11 N8018: "Technologies under study for reference picture management and high-level syntax for multiview video coding," Montreux, Switzerland, Apr. 2006, XP-0030014510.

ISO/IEC JTC1/SC29/WG11 N8019: "Description of Core Experiments in MVC," Montreux, Switzerland, Apr. 2006.

ITU-T Recommendation H.264, "Advanced video coding for generic audiovisual services," Series H: Audiovisual and Multimedia Systems, Infrastructure of Audiovisual Services—Coding of moving video, Mar. 2005.

Kim et al.: "Comments on High- Level syntax for MVC Contribution to the 76th MPEG meeting," International Organisation for Standardisation, ISO/IEC JTC1/SC29/WG1 MPEG2006/m13319, Montreux, Apr. 2006, XP-0030041988.

Martinian, E. et al.: Results of Core Experiment 1B on Multiview Coding, ISO/IEC JTC1/SC29/WG11, M13122, Apr. 2006, Montreux, Switzerland, 5 pgs.

International Search Report, dated Jul. 11, 2008.

* cited by examiner

METHODS AND APPARATUS USING VIRTUAL REFERENCE PICTURES

CROSS-REFERENCE TO RELATED APPLICATIONS

This application claims the benefit, under 35 U.S.C. §365 of International Application PCT/US2007/015719, filed Jul. 10, 2007 which was published in accordance with PCT Article 21(2) on Jan. 17, 2008 in English and which claims the benefit of U.S. provisional patent application No. 60/830,195 filed Jul. 11, 2006.

TECHNICAL FIELD

The present principles relate generally to video encoding and decoding and, more particularly, to methods and apparatus using virtual reference pictures.

BACKGROUND

In existing video compression systems and standards such as the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 recommendation (hereinafter the "MPEG-4 AVC standard"), previously reconstructed/decoded pictures are used as references for future pictures, while motion estimation and compensation is employed in order to compensate for any motion activity between those pictures. In Multi-view Video Coding (MVC), reconstructed/decoded pictures from neighboring views can also be used as source of prediction, where disparity estimation and compensation is involved.

There are cases where prediction can be enhanced if certain processing is applied to the decoded pictures such as, for example, weighted prediction in the MPEG-4 AVC standard and a prior art technique of adaptive reference generation. By processing decoded pictures, the quality of prediction signals could be enhanced and therefore the coding efficiency can be improved. In the case of weighted prediction, the global illumination mismatch is addressed between the current picture and the decoded pictures. In the case of adaptive reference generation, different types of noises can be suppressed by adaptive reference generation in order to provide more related reference signals.

SUMMARY

These and other drawbacks and disadvantages of the prior art are addressed by the present principles, which are directed to methods and apparatus using virtual reference pictures.

According to an aspect of the present principles, there is provided an apparatus. The apparatus includes an encoder for encoding at least one picture, using at least one virtual reference picture, to form a resultant bitstream. The at least one virtual reference picture is different than a previously decoded picture.

According to another aspect of the present principles, there is provided a method. The method includes encoding at least one picture, using at least one virtual reference picture, to form a resultant bitstream. The at least one virtual reference picture is different than a previously decoded picture.

According to yet another aspect of the present principles, there is provided an apparatus. The apparatus includes a decoder for decoding at least one picture, using at least one virtual reference picture, from a bitstream. The at least one virtual reference picture is different than a previously decoded picture.

According to a further aspect of the present principles, there is provided a method. The method includes decoding at least one picture, using at least one virtual reference picture, from a bitstream. The at least one virtual reference picture is different than a previously decoded picture.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

The present principles are directed to methods and apparatus using virtual reference pictures.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, picture parameter set level, sequence parameter set level and NAL unit header level.

Figure 1:
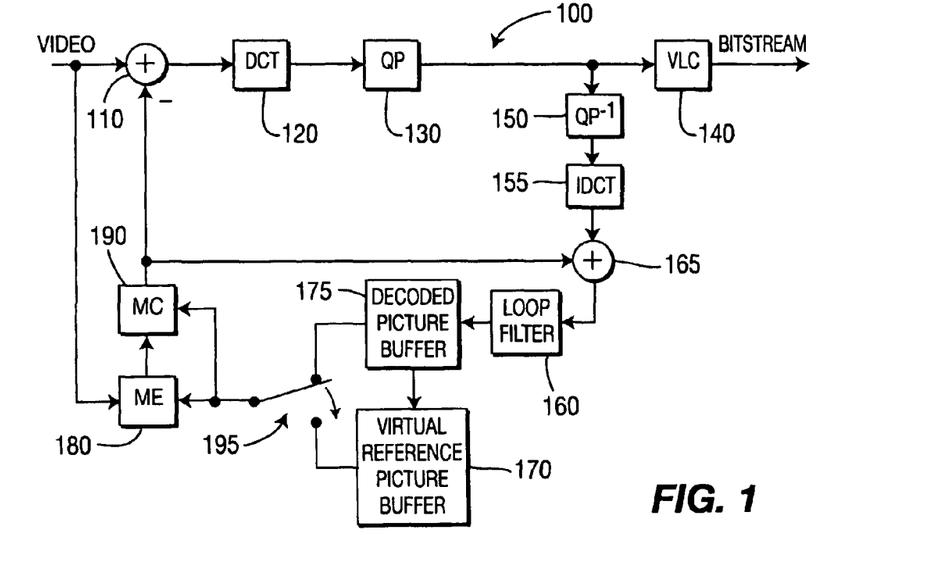
FIG. 1 is a block diagram for an exemplary video encoder supporting virtual reference pictures to which the present principles may be applied, in accordance with an embodiment of the present principles.

Turning to FIG. 1, an exemplary video encoder supporting virtual reference pictures to which the present principles may be applied is indicated generally by the reference numeral 100.

An input to the video encoder 100 is connected in signal communication with a non-inverting input of a combiner 110 and a first input of a motion estimator (ME) 180. The output of the combiner 110 is connected in signal communication with an input of a discrete cosine transformer 120. The output of the discrete cosine transformer 120 is connected in signal communication with an input of a quantizer 130. An output of the quantizer 130 is connected in signal communication with an input of a variable length coder (VLC) 140 and an input of an inverse quantizer 150. An output of the variable length coder (LVC) 140 is available as an output of the encoder 100.

An output of the inverse quantizer 150 is connected in signal communication with an input of an inverse discrete cosine transformer 155. An output of the inverse cosine transformer 155 is connected in signal communication with a first non-inverting input of a combiner 165. An output of the combiner 165 is connected in signal communication with an input of a loop filer 160. An output of the loop filer 160 is connected in signal communication with an input of a decoded picture buffer 175. A first output of the decoded picture buffer 175 is connected in signal communication with an input of a virtual reference pictures buffer 170.

An output of switch 195 is connected in signal communication with a second input of the motion estimator 180 and a second input of a motion compensator 190.

An input of the switch 195 is connected in signal communication with a second output of the decoded picture buffer 175 or an output of the virtual reference pictures buffer 170. An output of the motion estimator 180 is connected in signal communication with a first input of the motion compensator 190. An output of the motion compensator 190 is connected in signal communication with a second non-inverting input of the combiner 165 and an inverting input of the combiner 110.

Figure 2:
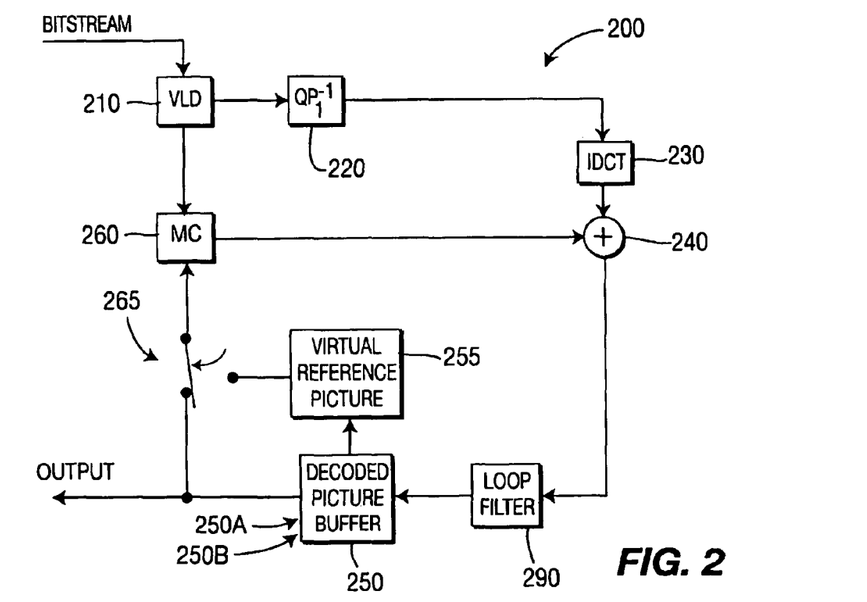
FIG. 2 is a block diagram for an exemplary video decoder supporting virtual reference pictures to which the present principles may be applied, in accordance with an embodiment of the present principles.

Turning to FIG. 2, an exemplary video decoder supporting virtual reference pictures to which the present principles may be applied is indicated generally by the reference numeral 200.

The video decoder 200 includes a variable length decoder 210 for receiving a bitstream. A first output of the variable length decoder 210 is connected in signal communication with a first input of a motion compensator 260. A second output of the variable length decoder 210 is connected in signal communication with an input of an inverse quantizer 220. An output of the inverse quantizer 220 is connected in signal communication with an input of an inverse discrete cosine transformer 230. An output of the discrete cosine transformer is connected in signal communication with a first non-inverting input of a combiner 240. An output of the combiner 240 is connected in signal communication with an input of a loop filter 290. An output of the loop filter 290 is connected in signal communication with an input of a decoded picture buffer 250. A first output of the decoded picture buffer 250 is connected in signal communication with an input of a virtual reference pictures buffer 255. A second output of the decoded picture buffer 250 is available as an output of the decoder 200.

An output of a switch 265 is connected in signal communication with a second input of the motion compensator 260. An output of the motion compensator 260 is connected in signal communication with a second non-inverting input of the combiner 240.

An input of the switch 265 is connected in signal communication with an output of the virtual reference pictures buffer 255 or the second output of the decoded picture buffer 250.

The decoded picture buffer 250 includes a long-term memory portion 250A and a short-term memory portion 250B.

In accordance with the present principles, methods and apparatus are provided for the management of virtual reference pictures (VRP) in a video encoder and/or video decoder. In an embodiment, virtual reference pictures are created from already decoded pictures, and are not required for display purposes. In an embodiment, virtual reference pictures can be utilized for prediction, but are not required for display purposes. In an embodiment, the use of VRP in a video encoder and/or decoder involves one or more of the following elements for implementation: syntax support; a storage/memory model for VRP; and a normative procedure of including VRP in the prediction loop.

By way of illustration and not limitation, some potential applications of the proposed management methods and apparatus include filtered reference prediction, reference warping, view interpolated prediction in Multi-view Video Coding (MVC) and other methods involving generated virtual references. Depending on the type of processing applied on decoded pictures, it might be impossible or inconvenient to obtain a processed reference signal on a local basis. Infinite Impulse Response (IIR) filtering and picture warping are two such examples, where it is better to apply the processing on a frame basis instead of on a block basis. Another example is view synthesis prediction. In multi-view video coding, the redundancy between adjacent camera views can be exploited through view synthesis. A view synthesized picture can be created by warping and blending neighboring view pictures using camera parameters and/or depth information. The synthesized picture can be used as a reference picture for the prediction of the current view picture, which could provide better prediction sources comparing to disparity compensated prediction. It should be noted that the concept of virtual reference pictures (VRP) can also be applied to scenarios where the processing can be done locally such as, for example, in the cases of sample weighting or Finite Impulse Response (FIR) filtering.

It is to be appreciated that while the concept of adaptive reference generation has been previously proposed and weighted prediction as a special case of filtered reference picture has been adopted in the MPEG-4 AVC standard, no known prior art exists for managing generated virtual reference pictures. In previously proposed methods, the management of generated references can be handled by simply processing/filtering the encoded/decoded pictures in the process of compensation. In other words, a complete generated reference picture is not needed for previous approaches. There is no prior art in how to manage fully generated reference pictures.

Embodiments incorporating the present principles may include one or more of the following aspects, further described in detail herein below: signaling of virtual reference pictures; memory management for virtual reference pictures; and usage of virtually generated frames in prediction Signaling of Virtual Reference Pictures It is desirable to support a flexible way to signal generated reference pictures which subsequently can be used in the management of those pictures in terms of storage and references. In order to do so, in one embodiment, we propose the following syntaxes.

In the embodiment, we signal at the sequence level whether VRP is enabled. This can be implemented, e.g., by introducing a high-level syntax vrp_present_flag.

In the embodiment, we signal at the picture level how many virtual references are present and the method to create them. For example, in one implementation of the embodiment, the use and the parameters required by generation of virtual reference pictures will be present in the syntax for each coded picture. For a possible MPEG-4 AVC standard based implementation, slice header syntaxes num_vrps could be introduced. Each virtual reference picture will be then assigned a vrp_id, which corresponds to the order in which virtual reference picture parameter syntaxes appear in the slice header. The parameters for the generation of each virtual reference picture will depend on the exact method of generation. In the example of view synthesized prediction in Multi-view Video Coding, camera parameters and depth information may be included. In the example of a warped reference in regular video coding, warping parameters (such as, for example, homograph matrix elements) may be signaled. A more concrete example in the case of adaptive reference filtering is to signal FIR filter coefficients, where $n^2$ coefficients will need to be quantized and transmitted if non-separable two-dimensional filters are to be applied.

Memory Management for Virtual Reference Pictures

Since the virtual reference pictures need to be generated and stored at both the encoder and decoder, the associated storage memory should be considered.

There are several approaches to providing a memory management model for virtual reference pictures: (1) in a first approach, store generated virtual reference pictures in the decoded picture buffer; and (2) in a second approach, store virtually generated frames in a temporary generated picture buffer which is only valid during the encoding/decoding of the current frame.

With respect to providing a memory management model in accordance with the first approach mentioned above, since virtual reference pictures are only needed for the encoding/decoding of the current picture, decoded picture buffer insertion and deletion processes should be properly defined. In one possible implementation, generated reference pictures will be inserted in the decoded picture buffer before reference lists are constructed, and will be removed right after the encoding/decoding of the current frame is finished.

When virtual reference pictures are stored in the decoded picture buffer, they will need to be differentiated from non-virtual decoded pictures, there are several options how this can be done in an MPEG-4 AVC-based implementation. Some exemplary options for differentiating virtual reference pictures stored in the decoded picture buffer from non-virtual reference pictures including, for example: (1) store virtual reference pictures as short-term reference pictures and use unused frame_num/picture_order_count; (2) store virtual reference pictures as long-term reference pictures and use unused longterm_id's in the long term memory; and (3) since a virtual reference picture is different from previously decoded pictures in nature, dedicated memory slots can be allocated in the decoded picture buffer for the storage of virtual reference pictures. In that VRP memory, virtual reference pictures will be identified by their vrp_id, which is unique for each virtual reference picture.

With respect to providing a memory management model in accordance with the second approach mentioned above, by sore virtually generated frames in a temporary generated picture buffer which is only valid during the encoding/decoding of the current frame, this temporary generated picture buffer will be able to store all virtually generated pictures. Virtual reference pictures will be identified by their vrp_id, which is unique for each virtual reference picture.

Usage of Virtually Generated Frames in Prediction

In order to allow virtually generated pictures to be referable for the prediction of the current picture, we need to allow a flexible way of including virtual reference pictures in the prediction process. In accordance with the present principles, two exemplary embodiments are proposed for accomplishing this, although it is to be appreciated that given the teachings of the present principles provided herein, one of ordinary skill in this and related arts will contemplate these and other ways to include virtual reference pictures in the prediction process, while maintaining the scope of the present principles.

In one embodiment for including virtual reference pictures in the prediction process, we refer virtual reference pictures directly. In this method, reference_vrp_id syntax is used to signal which virtual reference picture is used in the prediction process. By doing this, the conventional reference lists will stay untouched, and the syntax reference_vrp_id is only present when VRP is involved in the prediction.

In another embodiment for including virtual reference pictures in the prediction process, we refer virtual reference pictures through reference lists. Accordingly, the default reference list marking process may be modified to include virtual reference pictures if they are present, and we can use general RPLR commands to support construction of reference lists or VRP-specific Reference Picture List Reordering (RPLR) commands can be defined to support construction of reference lists. Specifically, if VRP-dedicated slots are allocated in the decoded picture buffer or a temporary VRP buffer is used, a VRP-specific RPLR command will be introduced to place the virtual reference picture indicated by reference_vrp_id into the reference list under construction. Moreover, we can introduce additional syntax elements in the slice header that will signal for each reference index whether it refers to a Virtual Reference Picture or not. If it does, then we can signal the same using the associated reference_vrp_id. In this method, we do not need to introduce a new VRP-specific RPLR command, because a general RPLR command can be used to allow a different reference index to refer to the same decoded picture in the Decoded Picture Buffer. Then, through the reference_vrp_id, we can signal if this reference picture is an original decoded reference picture or if it is a virtual reference picture generated from the decoded reference picture.

Figure 3:
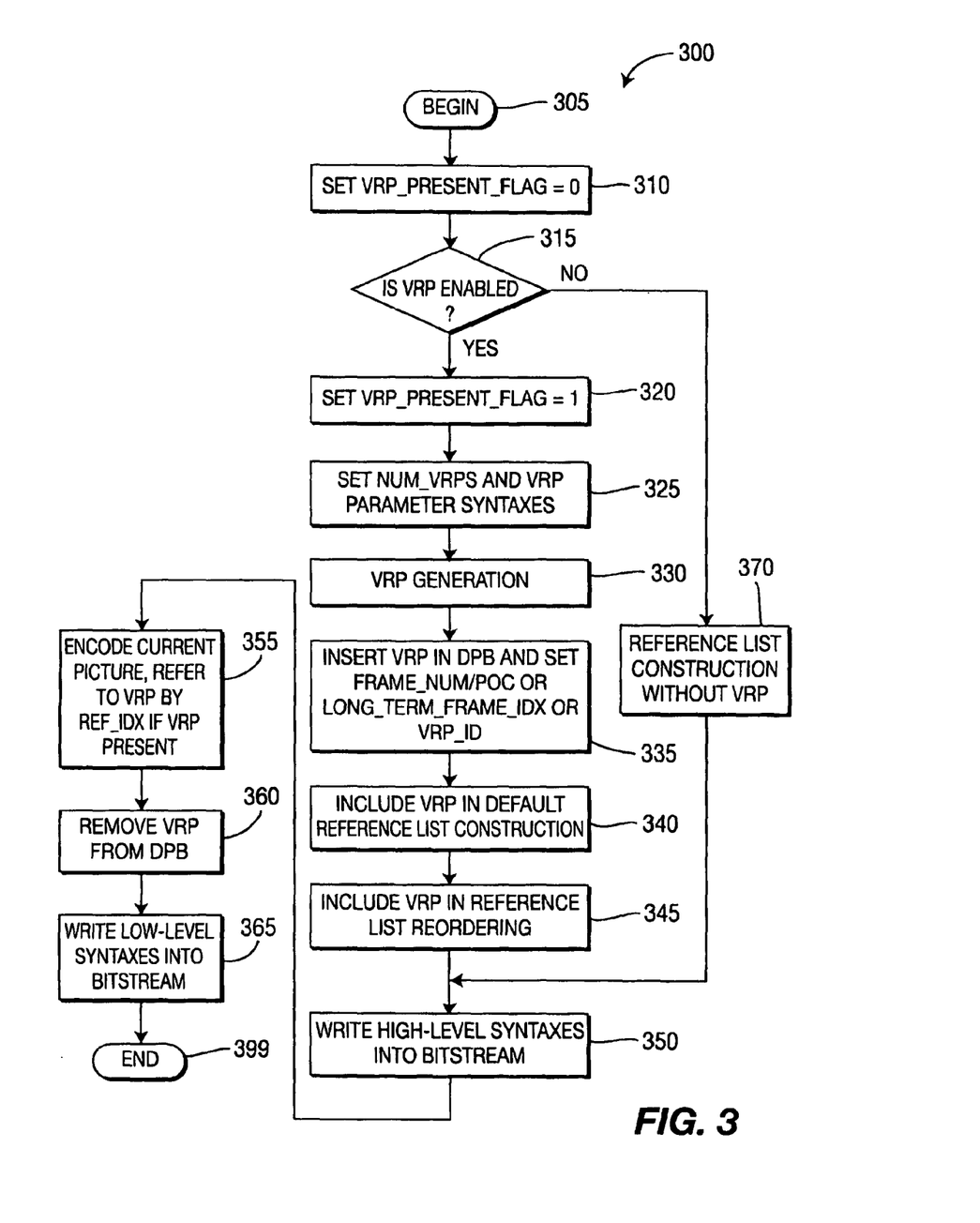
FIG. 3 is a flow diagram for an exemplary method for encoding video content using Virtual Reference Picture (VPR) management in a Decoded Picture Buffer (DPB), in accordance with an embodiment of the present principles.

Turning to FIG. 3, an exemplary method for encoding video content using Virtual Reference Picture (VPR) management in a Decoded Picture Buffer (DPB) is indicated generally by the reference numeral 300. The method 300 includes a start block 305 that passes control to a function block 310. The function block 310 sets vrp_present_flag equal to zero, and passes control to a decision block 315. The decision block 315 determines whether or not VRP is enabled. If so, then control is passed to a function block 320. Otherwise, control is passed to a function block 370.

The function block 320 sets vrp_present_flag equal to one, and passes control to a function block 325. The function block 325 sets num_vrps and VRP parameter syntaxes, and passes control to a function block 330. The function block 330 performs VRP generation to generate one or more VRPs (hereinafter "VRP"), and passes control to a function block 335. The function block 335 inserts the VRP in the decoded picture buffer (DPB), sets frame_num/Picture Order Count or long_term_frame_idx or vrp_id, and passes control to a function block 340. The function block 340 includes the VRP in reference list construction, and passes control to a function block 345. The function block 345 includes the VRP in reference list reordering, and passes control to a function block 350. The function block 350 writes high-level syntaxes into the bitstream, and passes control to a function block 355. The function block 355 encodes the current picture, refers to the VRP by ref_idx if the VRP is present, and passes control to a function block 360. The function block 360 removes the VRP from the DPB, and passes control to a function block 365. The function block 365 writes the low-level syntaxes into the bitstream, and passes control to an end block 399.

The function block 370 performs reference list construction with the VRP, and passes control to the function block 350.

Figure 4:
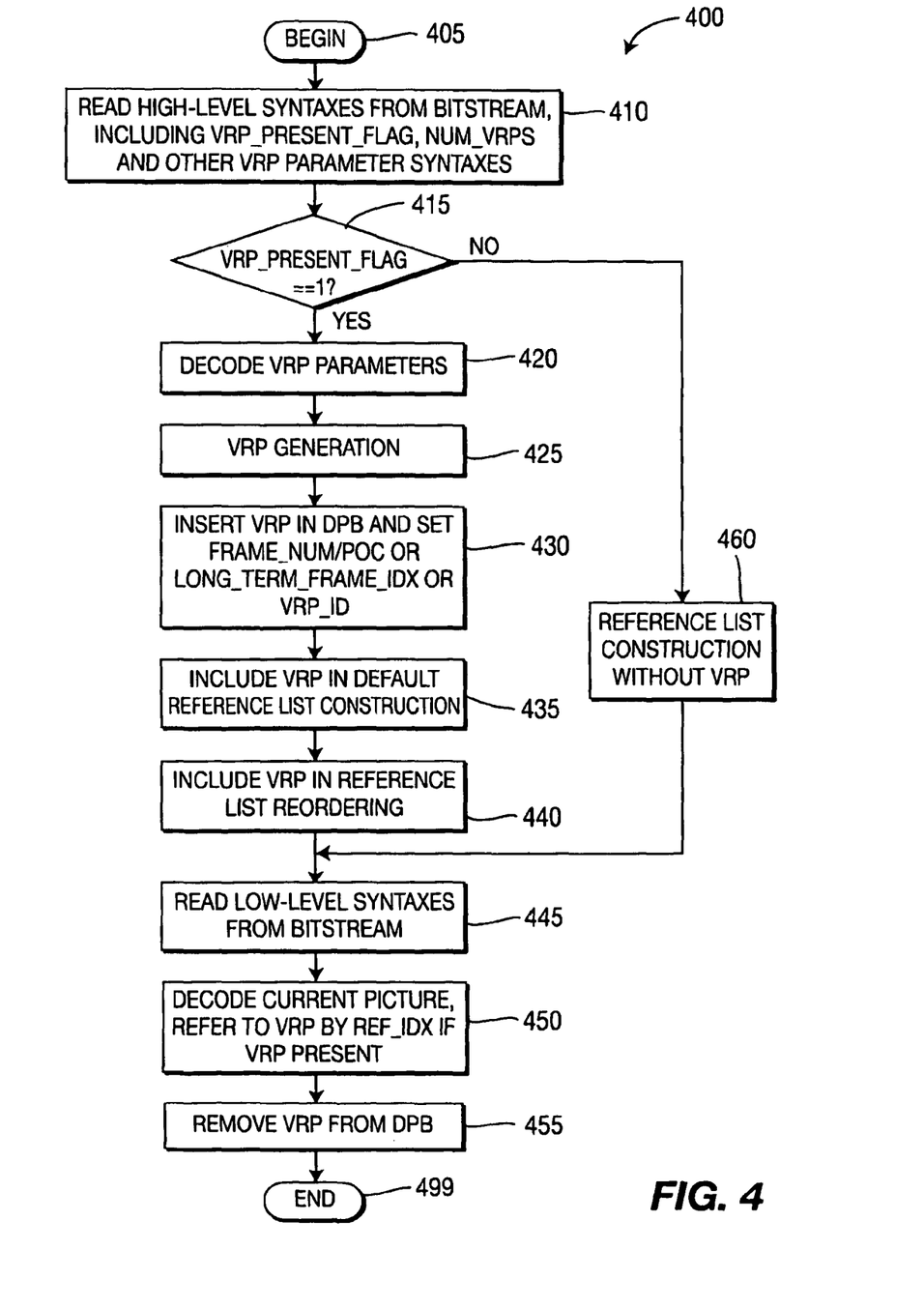
FIG. 4 is a flow diagram for an exemplary method for decoding video content using Virtual Reference Picture (VPR) management in a Decoded Picture Buffer (DPB), in accordance with an embodiment of the present principles.

Turning to FIG. 4, an exemplary method for decoding video content using Virtual Reference Picture (VPR) management in a Decoded Picture Buffer (DPB) is indicated generally by the reference numeral 400. The method 400 includes a start block 405 that passes control to a function block 410. The function block 410 reads high-level syntaxes from the bitstream including, e.g., vrp_present_flag, num_vrps, and other VRP parameter syntaxes, and passes control to a decision block 415. The decision block 415 determines whether or not vrp_present_flag is equal to one. If so, then control is passed to a function block 420. Otherwise, control is passed to a function block 460.

The function block 420 decodes the VRP parameters, and passes control to a function block 425. The function block 425 performs VRP generation to generate one or more VRPs (hereinafter "VRP"), and passes control to a function block 430. The function block 430 inserts the VRP into the DPB, sets frame_num/Picture Order Count or long_term_frame_idx or vrp_id, and passes control to a function block 435. The function block 435 includes the VRP in the default reference list construction, and passes control to a function block 440. The function block 440 includes the VRP in reference list reordering, and passes control to a function block 445. The function block 445 reads the low-level syntaxes from the bitstream, and passes control to a function block 450. The function block 450 decodes the current picture, refers to the VRP by ref_idx if the VRP is present, and passes control to a function block 455. The function block 455 removes the VRP from the DPB, and passes control to an end block 499.

The function block 460 performs reference list construction with the VRP, and passes control to the function block 445.

Figure 5:
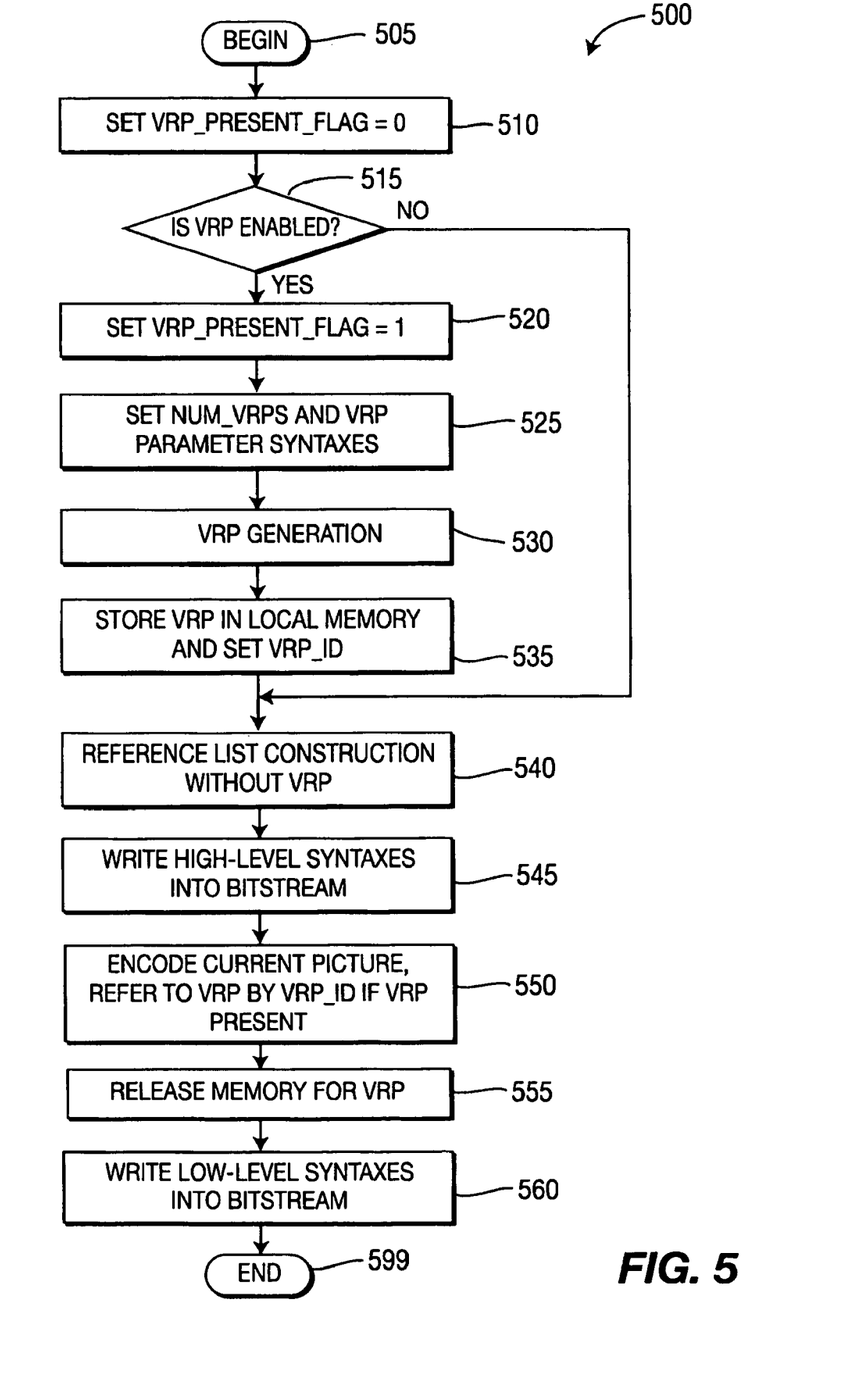
FIG. 5 is a flow diagram for an exemplary method for encoding video content using Virtual Reference Picture (VPR) management in local memory, in accordance with an embodiment of the present principles.

Turning to FIG. 5, an exemplary method for encoding video content using Virtual Reference Picture (VPR) management in local memory is indicated generally by the reference numeral 500. The method 500 includes a start block 505 that passes control to a function block 510. The function block 510 sets vrp_present_flag equal to zero, and passes control to a decision block 515. The decision block 515 determines whether or not VRP is enabled. If so, then control is passed to a function block 520. Otherwise, control is passed to a function block 540.

The function block 520 sets vrp_present_flag equal to one, and passes control to a function block 525. The function block 525 sets num_vrps and VRP parameter syntaxes, and passes control to a function block 530. The function block 530 performs VRP generation to generate one or more VRPs (hereinafter "VRP"), and passes control to a function block 535. The function block 535 stores the VRP in local memory, sets vrp_id, and passes control to a function block 540. The function block 540 performs reference list construction with the VRP, and passes control to a function block 545. The function block 545 writes high-level syntaxes into the bitstream, and passes control to a function block 550. The function block 550 encodes the current picture, refers to the VRP by vrp_id if the VRP is present, and passes control to a function block 555. The function block 555 releases the memory allocated for the VRP, and passes control to a function block 560. The function block 560 writes low-level syntaxes into the bitstream, and passes control to an end block 599.

Figure 6:
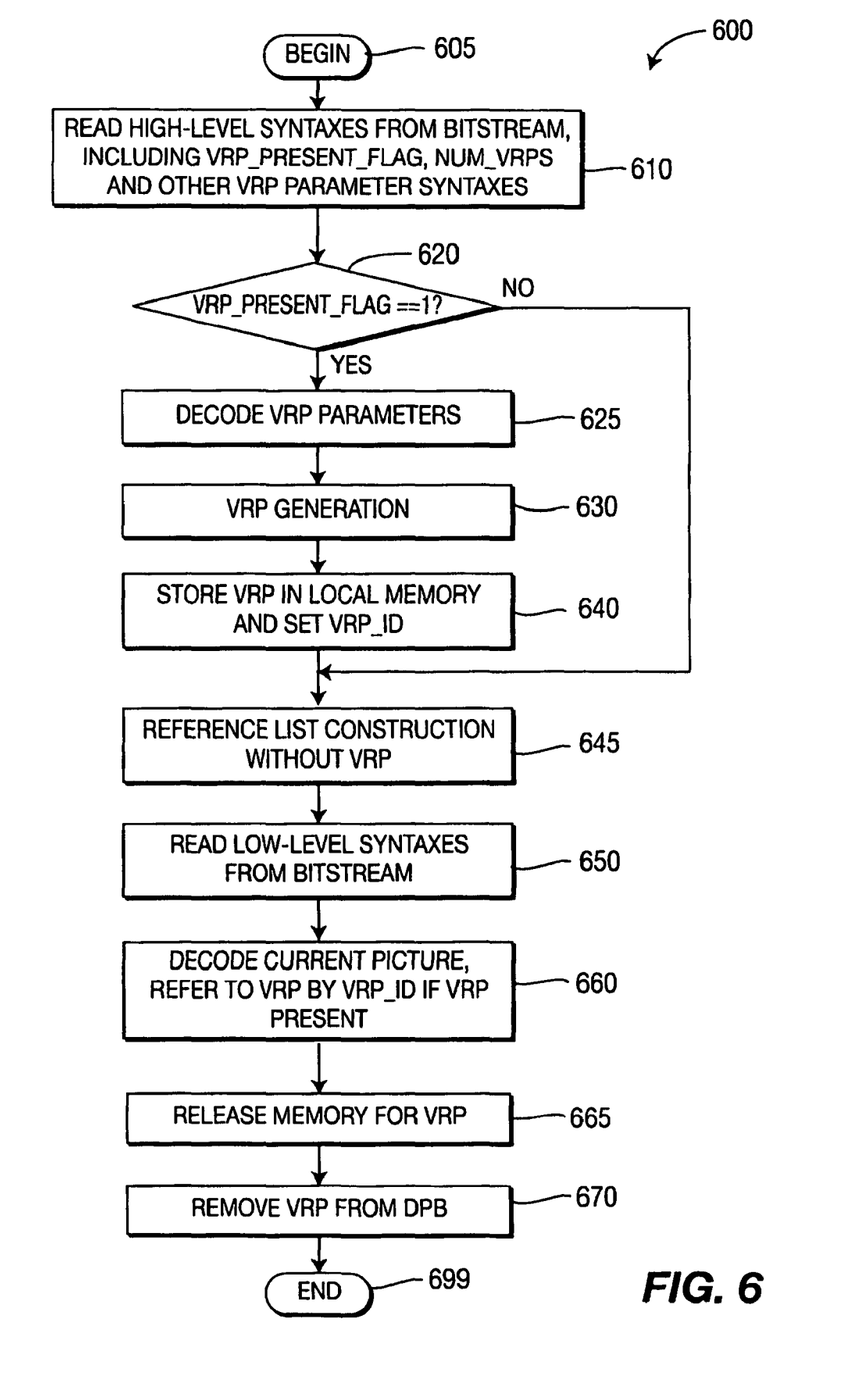
FIG. 6 is a flow diagram for an exemplary method for decoding video content using Virtual Reference Picture (VPR) management in a Decoded Picture Buffer (DPB), in accordance with an embodiment of the present principles.

Turning to FIG. 6, an exemplary method for decoding video content using Virtual Reference Picture (VPR) management in a Decoded Picture Buffer (DPB) is indicated generally by the reference numeral 600. The method 600 includes a start block 605 that passes control to a function block 610. The function block 610 reads high-level syntaxes from the bitstream including, e.g., vrp_present_flag, num_vrps, and other VRP parameter syntaxes, and passes control to a decision block 620. The decision block 620 determines whether or not vrp_present_flag is equal to one. If so, then control is passed to a function block 625. Otherwise, control is passed to a function block 645.

The function block 625 decodes the VRP parameters, and passes control to a function block 630. The function block 630 performs VRP generation to generate one or more VRPs (hereinafter "VRP"), and passes control to a function block 640. The function block 640 stores the VRP in the local memory, sets vrp_id, and passes control to a function block 645. The function block 645 performs reference list construction without the VRP, and passes control to a function block 650. The function block 650 reads the low-level syntaxes from the bitstream, and passes control to a function block 660. The function block 660 decodes the current picture, refers to the VRP by vrp_id if the VRP is present, and passes control to a function block 665. The function block 665 releases the memory allocated for the VRP, and passes control to a function block 670. The function block 670 removes the VRP from the DPB, and passes control to an end block 699.

A description will now be given of some of the many attendant advantages/features of the present invention, some of which have been mentioned above. For example, one advantage/feature is an apparatus that includes an encoder for encoding at least one picture, using at least one virtual reference picture, to form a resultant bitstream. The at least one virtual reference picture is different than a previously decoded picture.

Another advantage/feature is the apparatus having the encoder as described above, wherein the at least one picture corresponds to at least one of at least two views of multi-view video content.

Yet another advantage/feature is the apparatus having the encoder as described above, wherein the at least one virtual reference picture is formed from at least one reference picture that has undergone a signal processing transformation.

Moreover, another advantage/feature is the apparatus having the encoder wherein the at least one virtual reference picture is formed from at least one reference picture that has undergone a signal processing transformation as described above, wherein the encoder signals warping parameters of the signal processing transformation in at least one high level syntax included in the resultant bitstream.

Further, another advantage/feature is the apparatus having the encoder as described above, wherein the at least one virtual reference picture is formed from at least one filtered reference picture.

Also, another advantage/feature is the apparatus having the encoder wherein the at least one virtual reference picture is formed from at least one filtered reference picture as described above, wherein the encoder signals filter coefficients used to filter the at least one filtered reference picture in at least one high level syntax included in the resultant bitstream.

Additionally, another advantage/feature is the apparatus having the encoder as described above, wherein the at least one picture corresponds to multi-view video content, and the at least one virtual reference picture is formed using at least one view interpolated picture.

Moreover, another advantage/feature is the apparatus having the encoder wherein the at least one picture corresponds to multi-view video content as described above, wherein the encoder signals parameters for the at least one view interpolated picture in at least one high level syntax element included in the resultant bitstream.

Further, another advantage/feature is the apparatus having the encoder as described above, wherein the encoder signals an existence of the at least one virtual reference picture in the resultant bitstream.

Also, another advantage/feature is the apparatus having the encoder as described above, wherein the encoder signals an existence of the at least one virtual reference picture in a high-level syntax in the resultant bitstream.

Additionally, another advantage/feature is the apparatus having the encoder as described above, wherein at least one of a method and a parameter for creating the at least one virtual reference picture is signaled in at least one high level syntax element included in the resultant bitstream.

Moreover, another advantage/feature is the apparatus having the encoder as described above, wherein the at least one virtual reference picture is stored in a decoded picture buffer.

Further, another advantage/feature is the apparatus having the encoder wherein the at least one virtual reference picture is stored in a decoded picture buffer as described above, wherein the encoder utilizes pre-specified insertion and deletion operations for the at least one virtual reference picture with respect to the decoded picture buffer.

Also, another advantage/feature is the apparatus having the encoder wherein the at least one virtual reference picture is stored in a decoded picture buffer as described above, wherein the at least one virtual reference picture is stored in a short-term memory portion of the decoded picture buffer.

Additionally, another advantage/feature is the apparatus having the encoder wherein the at least one virtual reference picture is stored in a decoded picture buffer as described above, wherein the at least one virtual reference picture is stored in a long-term memory portion of the decoded picture buffer.

Moreover, another advantage/feature is the apparatus having the encoder as described above, wherein the at least one virtual reference picture is stored in a dedicated memory for virtual reference pictures.

Further, another advantage/feature is the apparatus having the encoder as described above, wherein the at least one virtual reference picture is stored in a temporary picture buffer separate from a decoded picture buffer.

Also, another advantage/feature is the apparatus having the encoder as described above, wherein the encoder directly refers to the at least one virtual reference picture in a prediction process for the at least one picture, using an index of the at least one virtual reference picture.

Additionally, another advantage/feature is the apparatus having the encoder, wherein the encoder directly refers to the at least one virtual reference picture in a prediction process for the at least one picture as described above, wherein a default reference list construction process is performed to include the at least one virtual reference picture.

Moreover, another advantage/feature is the apparatus having the encoder wherein a default reference list construction process is performed to include the at least one virtual reference picture as described above, wherein at least one reference picture list reordering command is defined to include the at least one virtual reference picture in the default reference list construction.

Further, another advantage/feature is the apparatus having the encoder wherein a default reference list construction process is performed to include the at least one virtual reference picture as described above, wherein a pre-specified reference list reordering command is combined with a high level syntax to include the at least one virtual reference picture in the default reference list construction.

Also, another advantage/feature is the apparatus having the encoder as described above, wherein each of the at least one virtual reference picture is respectively referred to by a reference picture index corresponding to a reference picture list.

Another advantage/feature is an apparatus having a decoder for decoding at least one picture, using at least one virtual reference picture, from a bitstream. The at least one virtual reference picture is different than a previously decoded picture.

Yet another advantage/feature is the apparatus having the decoder as described above, wherein the at least one picture corresponds to at least one of at least two views of multi-view video content.

Moreover, another advantage/feature is the apparatus having the decoder as described above, wherein the at least one virtual reference picture is formed from at least one reference picture that has undergone a signal processing transformation.

Moreover, another advantage/feature is the apparatus having the decoder wherein the at least one virtual reference picture is formed from at least one reference picture that has undergone a signal processing transformation as described above, wherein the decoder determines warping parameters of the signal processing transformation from at least one high level syntax included in the bitstream.

Further, another advantage/feature is the apparatus having the decoder wherein the at least one virtual reference picture is formed from at least one reference picture that has undergone a signal processing transformation as described above, wherein the at least one virtual reference picture is formed from at least one filtered reference picture.

Also, another advantage/feature is the apparatus having the decoder wherein the at least one virtual reference picture is formed from at least one filtered reference picture as described above, wherein the decoder determines filter coefficients used to filter the at least one filtered reference picture from at least one high level syntax included in the bitstream.

Additionally, another advantage/feature is the apparatus having the decoder as described above, wherein the at least one picture corresponds to multi-view video content, and the at least one virtual reference picture is formed using at least one view interpolated picture.

Moreover, another advantage/feature is the apparatus having the decoder wherein the at least one picture corresponds to multi-view video content as described above, wherein the decoder determines parameters for the at least one view interpolated picture from at least one high level syntax element included in the resultant bitstream.

Further, another advantage/feature is the apparatus having the decoder as described above, wherein the decoder determines an existence of the at least one virtual reference picture in the bitstream.

Also, another advantage/feature is the apparatus having the decoder as described above, wherein the decoder determines an existence of the at least one virtual reference picture from a high-level syntax in the bitstream.

Additionally, another advantage/feature is the apparatus having the decoder as described above, wherein at least one of a method and a parameter for creating the at least one virtual reference picture is determined from at least one high level syntax element included in the bitstream.

Moreover, another advantage/feature is the apparatus having the decoder as described above, wherein the at least one virtual reference picture is stored in a decoded picture buffer.

Further, another advantage/feature is the apparatus having the decoder wherein the at least one virtual reference picture is stored in a decoded picture buffer as described above, wherein the decoder utilizes pre-specified insertion and deletion operations for the at least one virtual reference picture with respect to the decoded picture buffer.

Also, another advantage/feature is the apparatus having the decoder wherein the at least one virtual reference picture is stored in a decoded picture buffer as described above, wherein the at least one virtual reference picture is stored in a short-term memory portion of the decoded picture buffer.

Additionally, another advantage/feature is the apparatus having the decoder wherein the at least one virtual reference picture is stored in a decoded picture buffer as described above, wherein the at least one virtual reference picture is stored in a long-term memory portion of the decoded picture buffer.

Moreover, another advantage/feature is the apparatus having the decoder as described above, wherein the at least one virtual reference picture is stored in a dedicated memory for virtual reference pictures.

Further, another advantage/feature is the apparatus having the decoder as described above, wherein the at least one virtual reference picture is stored in a temporary picture buffer separate from a decoded picture buffer.

Also, another advantage/feature is the apparatus having the decoder as described above, wherein the decoder directly refers to the at least one virtual reference picture in a prediction process for the at least one picture, using an index of the at least one virtual reference picture.

Additionally, another advantage/feature is the apparatus having the decoder wherein the decoder directly refers to the at least one virtual reference picture in a prediction process for the at least one picture as described above, wherein a default reference list construction process is performed to include the at least one virtual reference picture.

Moreover, another advantage/feature is the apparatus having the decoder wherein a default reference list construction process is performed to include the at least one virtual reference picture as described above, wherein at least one reference picture list reordering command is defined to include the at least one virtual reference picture in the default reference list construction.

Further, another advantage/feature is the apparatus having the decoder as described above, wherein each of the at least one virtual reference picture is respectively referred to by a reference picture index corresponding to a reference picture list.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
an encoder for encoding at least one picture, using at least one virtual reference picture, to form a resultant bitstream, wherein the at least one virtual reference picture is different than a previously decoded picture, and the at least one virtual reference picture is stored in a decoded picture buffer that also stores non-virtual reference pictures.

2. The apparatus of claim 1, wherein the at least one picture corresponds to at least one of at least two views of multi-view video content.

3. The apparatus of claim 1, wherein the at least one virtual reference picture is formed from at least one reference picture that has undergone a signal processing transformation.

4. The apparatus of claim 3, wherein said encoder signals warping parameters of the signal processing transformation in at least one high level syntax included in the resultant bitstream.

5. The apparatus of claim 1, wherein the at least one virtual reference picture is formed from at least one filtered reference picture.

6. The apparatus of claim 5, wherein said encoder signals filter coefficients used to filter the at least one filtered reference picture in at least one high level syntax included in the resultant bitstream.

7. The apparatus of claim 1, wherein the at least one picture corresponds to multi-view video content, and the at least one virtual reference picture is formed using at least one view interpolated picture.

8. The apparatus of claim 7, wherein said encoder signals parameters for the at least one view interpolated picture in at least one high level syntax element included in the resultant bitstream.

9. The apparatus of claim 1, wherein said encoder signals an existence of the at least one virtual reference picture in the resultant bitstream.

10. The apparatus of claim 1, wherein said encoder signals an existence of the at least one virtual reference picture in a high-level syntax in the resultant bitstream.

11. The apparatus of claim 1, wherein at least one of a method and a parameter for creating the at least one virtual reference picture is signaled in at least one high level syntax element included in the resultant bitstream.

12. The apparatus of claim 1, wherein said encoder utilizes pre-specified insertion and deletion operations for the at least one virtual reference picture with respect to the decoded picture buffer.

13. The apparatus of claim 1, wherein the at least one virtual reference picture is stored in a short-term memory portion of the decoded picture buffer.

14. The apparatus of claim 1, wherein the at least one virtual reference picture is stored in a long-term memory portion of the decoded picture buffer.

15. The apparatus of claim 1, wherein said encoder directly refers to the at least one virtual reference picture in a prediction process for the at least one picture, using an index of the at least one virtual reference picture.

16. The apparatus of claim 15, wherein a default reference list construction process is performed to include the at least one virtual reference picture.

17. The apparatus of claim 16, wherein at least one reference picture list reordering command is defined to include the at least one virtual reference picture in the default reference list construction.

18. The apparatus of claim 16, wherein a pre-specified reference list reordering command is combined with a high level syntax to include the at least one virtual reference picture in the default reference list construction.

19. The apparatus of claim 1, wherein each of the at least one virtual reference picture is respectively referred to by a reference picture index corresponding to a reference picture list.

20. In a video encoder, a method, comprising:
encoding at least one picture, using at least one virtual reference picture, to form a resultant bitstream, wherein the at least one virtual reference picture is different than a previously decoded picture, and the at least one virtual reference picture is stored in a decoded picture buffer that also stores non-virtual reference pictures.

21. The method of claim 20, wherein the at least one picture corresponds to at least one of at least two views of multi-view video content.

22. The method of claim 20, wherein the at least one virtual reference picture is formed from at least one reference picture that has undergone a signal processing transformation.

23. The method of claim 22, wherein said encoding step comprises signaling warping parameters of the signal processing transformation in at least one high level syntax included in the resultant bitstream.

24. The method of claim 20, wherein the at least one virtual reference picture is formed from at least one filtered reference picture.

25. The method of claim 24, wherein said encoding step comprises signaling filter coefficients used to filter the at least one filtered reference picture in at least one high level syntax included in the resultant bitstream.

26. The method of claim 20, wherein the at least one picture corresponds to multi-view video content, and the at least one virtual reference picture is formed using at least one view interpolated picture.

27. The method of claim 26, wherein said encoding step comprises signaling parameters for the at least one view interpolated picture in at least one high level syntax element included in the resultant bitstream.

28. The method of claim 20, wherein said encoding step comprises signaling an existence of the at least one virtual reference picture in the resultant bitstream.

29. The method of claim 20, wherein said encoding step comprises signaling an existence of the at least one virtual reference picture in a high-level syntax in the resultant bitstream.

30. The method of claim 20, wherein said encoding step comprises signaling at least one of a method and a parameter for creating the at least one virtual reference picture in at least one high level syntax element included in the resultant bitstream.

31. The method claim 20, further comprising utilizing pre-specified insertion and deletion operations for the at least one virtual reference picture with respect to the decoded picture buffer.

32. The method of claim 20, further comprising storing the at least one virtual reference picture in a short-term memory portion of the decoded picture buffer.

33. The method of claim 20, further comprising storing the at least one virtual reference picture in a long-term memory portion of the decoded picture buffer.

34. The method of claim 20, wherein said encoding step directly refers to the at least one virtual reference picture in a prediction process for the at least one picture, using an index of the at least one virtual reference picture.

35. The method of claim 34, further comprising performing a default reference list construction process that includes the at least one virtual reference picture.

36. The method of claim 35, further comprising defining at least one reference picture list reordering command to include the at least one virtual reference picture in the default reference list construction process.

37. The method of claim 35, wherein said step of performing the default reference list construction process comprises combining a pre-specified reference list reordering command with a high level syntax to include the at least one virtual reference picture in the default reference list construction.

38. The method of claim 20, wherein each of the at least one virtual reference picture is respectively referred to by a reference picture index corresponding to a reference picture list.

39. An apparatus, comprising:
a decoder for decoding at least one picture, using at least one virtual reference picture, from a bitstream, wherein the at least one virtual reference picture is different than a previously decoded picture, and the at least one virtual reference picture is stored in a decoded picture buffer that also stores non-virtual reference pictures.

40. The apparatus of claim 39, wherein the at least one picture corresponds to at least one of at least two views of multi-view video content.

41. The apparatus of claim 39, wherein the at least one virtual reference picture is formed from at least one reference picture that has undergone a signal processing transformation.

42. The apparatus of claim 41, wherein said decoder determines warping parameters of the signal processing transformation from at least one high level syntax included in the bitstream.

43. The apparatus of claim 39, wherein the at least one virtual reference picture is formed from at least one filtered reference picture.

44. The apparatus of claim 43, wherein said decoder determines filter coefficients used to filter the at least one filtered reference picture from at least one high level syntax included in the bitstream.

45. The apparatus of claim 39, wherein the at least one picture corresponds to multi-view video content, and the at least one virtual reference picture is formed using at least one view interpolated picture.

46. The apparatus of claim 45, wherein said decoder determines parameters for the at least one view interpolated picture from at least one high level syntax element included in the resultant bitstream.

47. The apparatus of claim 39, wherein said decoder determines an existence of the at least one virtual reference picture in the bitstream.

48. The apparatus of claim 39, wherein said decoder determines an existence of the at least one virtual reference picture from a high-level syntax in the bitstream.

49. The apparatus of claim 39, wherein at least one of a method and a parameter for creating the at least one virtual reference picture is determined from at least one high level syntax element included in the bitstream.

50. The apparatus of claim 39, wherein said decoder utilizes pre-specified insertion and deletion operations for the at least one virtual reference picture with respect to the decoded picture buffer.

51. The apparatus of claim 39, wherein the at least one virtual reference picture is stored in a short-term memory portion of the decoded picture buffer.

52. The apparatus of claim 39, wherein the at least one virtual reference picture is stored in a long-term memory portion of the decoded picture buffer.

53. The apparatus of claim 39, wherein said decoder directly refers to the at least one virtual reference picture in a prediction process for the at least one picture, using an index of the at least one virtual reference picture.

54. The apparatus of claim 53, wherein a default reference list construction process is performed to include the at least one virtual reference picture.

55. The apparatus of claim 54, wherein at least one reference picture list reordering command is defined to include the at least one virtual reference picture in the default reference list construction.

56. The apparatus of claim 39, wherein each of the at least one virtual reference picture is respectively referred to by a reference picture index corresponding to a reference picture list.

57. In a video decoder, a method, comprising:
decoding at least one picture, using at least one virtual reference picture, from a bitstream, wherein the at least one virtual reference picture is different than a previously decoded picture, and the at least one virtual reference picture is stored in a decoded picture buffer that also stores non-virtual reference pictures.

58. The method of claim 57, wherein the at least one picture corresponds to at least one of at least two views of multi-view video content.

59. The method of claim 57, wherein the at least one virtual reference picture is formed from at least one reference picture that has undergone a signal processing transformation.

60. The method of claim 59, wherein said decoding step comprises determining warping parameters of the signal processing transformation from at least one high level syntax included in the bitstream.

61. The method of claim 57, wherein the at least one virtual reference picture is formed from at least one filtered reference picture.

62. The method of claim 61, wherein said decoding step comprises determining filter coefficients used to filter the at least one filtered reference picture from at least one high level syntax included in the bitstream.

63. The method of claim 57, wherein the at least one picture corresponds to multi-view video content, and the at least one virtual reference picture is formed using at least one view interpolated picture.

64. The method of claim 63, wherein said decoding step comprises determining parameters for the at least one view interpolated picture from at least one high level syntax element included in the resultant bitstream.

65. The method of claim 57, wherein said decoding step comprises determining an existence of the at least one virtual reference picture in the bitstream.

66. The method of claim 57, wherein said decoding step comprises determining an existence of the at least one virtual reference picture from a high-level syntax in the bitstream.

67. The method of claim 57, wherein said decoding step comprises determining at least one of a method and a parameter for creating the at least one virtual reference picture from at least one high level syntax element included in the bitstream.

68. The method of claim 57, further comprising utilizing pre-specified insertion and deletion operations for the at least one virtual reference picture with respect to the decoded picture buffer.

69. The method of claim 57, further comprising storing the at least one virtual reference picture in a short-term memory portion of the decoded picture buffer.

70. The method of claim 57, further comprising storing the at least one virtual reference picture in a long-term memory portion of the decoded picture buffer.

71. The method of claim 57, wherein said encoding step directly refers to the at least one virtual reference picture in a prediction process for the at least one picture, using an index of the at least one virtual reference picture.

72. The method of claim 71, further comprising performing a default reference list construction process that includes the at least one virtual reference picture.

73. The method of claim 72, further comprising defining at least one reference picture list reordering command to include the at least one virtual reference picture in the default reference list construction process.

74. The method of claim 57, wherein each of the at least one virtual reference picture is respectively referred to by a reference picture index corresponding to a reference picture list.

75. A non-transitory computer readable storage media having video signal data encoded thereupon, comprising:
at least one picture, encoded using at least one virtual reference picture, to form a resultant bitstream, wherein the at least one virtual reference picture is different than a previously decoded picture, and the at least one virtual reference picture is stored in a decoded picture buffer that also stores non-virtual reference pictures.

76. The apparatus of claim 1, wherein dedicated memory slots are used in the decoded picture buffer to store virtual reference pictures including the virtual picture, and wherein each of the virtual reference pictures are identified by a virtual reference picture identifier that is unique for each of the virtual reference pictures.

77. The method of claim 20, wherein dedicated memory slots are used in the decoded picture buffer to store virtual reference pictures including the virtual picture, and wherein each of the virtual reference pictures are identified by a virtual reference picture identifier that is unique for each of the virtual reference pictures.

78. The apparatus of claim 39, wherein dedicated memory slots are used in the decoded picture buffer to store virtual reference pictures including the virtual picture, and wherein each of the virtual reference pictures are identified by a virtual reference picture identifier that is unique for each of the virtual reference pictures.

79. The method of claim 57, wherein dedicated memory slots are used in the decoded picture buffer to store virtual reference pictures including the virtual picture, and wherein each of the virtual reference pictures are identified by a virtual reference picture identifier that is unique for each of the virtual reference pictures.

80. The apparatus of claim 13, wherein the at least one virtual reference picture and any other virtual reference pictures are stored in the short-term memory portion of the decoded picture buffer using unused frame numbers and unused picture order counts to differentiate the virtual reference pictures from the non-virtual reference pictures.

81. The method of claim 32, wherein the at least one virtual reference picture and any other virtual reference pictures are stored in the short-term memory portion of the decoded picture buffer using unused frame numbers and unused picture order counts to differentiate the virtual reference pictures from the non-virtual reference pictures.

82. The apparatus of claim 51, wherein the at least one virtual reference picture and any other virtual reference pictures are stored in the short-term memory portion of the decoded picture buffer using unused frame numbers and unused picture order counts to differentiate the virtual reference pictures from the non-virtual reference pictures.

83. The method of claim 69, wherein the at least one virtual reference picture and any other virtual reference pictures are stored in the short-term memory portion of the decoded picture buffer using unused frame numbers and unused picture order counts to differentiate the virtual reference pictures from the non-virtual reference pictures.

84. The apparatus of claim 14, wherein the at least one virtual reference picture and any other virtual reference pictures are stored in the long-term memory portion of the decoded picture buffer using unused long term identifiers to differentiate the virtual reference pictures from the non-virtual reference pictures.

85. The method of claim 33, wherein the at least one virtual reference picture and any other virtual reference pictures are stored in the long-term memory portion of the decoded picture buffer using unused long term identifiers to differentiate the virtual reference pictures from the non-virtual reference pictures.

86. The apparatus of claim 52, wherein the at least one virtual reference picture and any other virtual reference pictures are stored in the long-term memory portion of the decoded picture buffer using unused long term identifiers to differentiate the virtual reference pictures from the non-virtual reference pictures.

87. The method of claim 70, wherein the at least one virtual reference picture and any other virtual reference pictures are stored in the long-term memory portion of the decoded picture buffer using unused long term identifiers to differentiate the virtual reference pictures from the non-virtual reference pictures.

* * * * *